US007907936B2

(12) United States Patent
Suzuki

(10) Patent No.: US 7,907,936 B2
(45) Date of Patent: Mar. 15, 2011

(54) COMMUNICATION SYSTEM, WIRELESS-COMMUNICATION DEVICE, AND CONTROL METHOD THEREFOR

(75) Inventor: Hideyuki Suzuki, Tokyo (JP)

(73) Assignee: Sony Corporation, Tokyo (JP)

( * ) Notice: Subject to any disclaimer, the term of this patent is extended or adjusted under 35 U.S.C. 154(b) by 882 days.

(21) Appl. No.: 11/838,718

(22) Filed: Aug. 14, 2007

(65) Prior Publication Data

US 2008/0045181 A1 Feb. 21, 2008

(30) Foreign Application Priority Data

Aug. 15, 2006 (JP) .................................. 2006-221719

(51) Int. Cl.
 *H04M 1/66* (2006.01)
(52) U.S. Cl. ......... 455/411; 455/410; 455/560; 713/169; 380/247
(58) Field of Classification Search .......... 455/410–411, 455/560; 380/247, 270; 713/169–171; 726/2
See application file for complete search history.

(56) References Cited

U.S. PATENT DOCUMENTS

| 6,091,945 | A  | * | 7/2000 | Oka .............................. 455/411 |
| 7,236,477 | B2 | * | 6/2007 | Emeott et al. ................. 370/331 |
| 7,263,076 | B1 | * | 8/2007 | Leibovitz et al. ............. 370/310 |
| 7,325,246 | B1 | * | 1/2008 | Halasz et al. ..................... 726/2 |
| 7,373,508 | B1 | * | 5/2008 | Meier et al. .................... 713/168 |
| 7,461,253 | B2 | * | 12/2008 | Braskich et al. .............. 713/169 |
| 7,496,344 | B2 | * | 2/2009 | Stadelmann et al. ......... 455/406 |
| 7,596,368 | B2 | * | 9/2009 | Yamada et al. ................ 455/411 |
| 7,746,810 | B2 | * | 6/2010 | Sinha et al. .................... 370/278 |
| 2004/0103278 | A1 |  | 5/2004 | Abhishek et al. |
| 2004/0253943 | A1 |  | 12/2004 | Suzuki et al. |
| 2004/0259529 | A1 |  | 12/2004 | Suzuki |
| 2005/0003814 | A1 |  | 1/2005 | Saito et al. |
| 2005/0032506 | A1 | * | 2/2005 | Walker .......................... 455/411 |
| 2005/0123141 | A1 |  | 6/2005 | Suzuki |
| 2005/0138359 | A1 | * | 6/2005 | Simon et al. .................. 713/156 |

(Continued)

FOREIGN PATENT DOCUMENTS

EP             1653676          5/2006

(Continued)

OTHER PUBLICATIONS

Part 11: Wireless LAN Medium Access Control (MAC) and Physical Layer (PHY) Specifications; IEEE 802.11i, Jul. 23, 2004.

(Continued)

*Primary Examiner* — Sharad Rampuria
(74) *Attorney, Agent, or Firm* — Finnegan, Henderson, Farabow, Garrett & Dunner, L.L.P.

(57) ABSTRACT

A wireless-communication device performing mutual authentication between the wireless-communication device and a different wireless-communication device by using an authentication server includes a communication-setting-data-retention unit retaining communication-setting data including a first metric corresponding to the path to the authentication server, as a self-authentication-server metric, a signal-reception unit receiving a predetermined signal transmitted from the different wireless-communication device, the predetermined signal including a second metric corresponding to the path from the different wireless-communication device to the authentication server, as a nonself-authentication-server metric, and a control unit determining the wireless-communication device to be a supplicant when the self-authentication-server metric is better than the nonself-authentication-server metric, and determining the wireless-communication device to be an authenticator when the self-authentication-server metric is worse than the nonself-authentication-server metric.

16 Claims, 14 Drawing Sheets

U.S. PATENT DOCUMENTS

| | | |
|---|---|---|
| 2005/0159134 A1 | 7/2005 | Suzuki |
| 2005/0201564 A1* | 9/2005 | Kayashima et al. ........... 380/283 |
| 2005/0254653 A1* | 11/2005 | Potashnik et al. ............. 380/270 |
| 2006/0083377 A1* | 4/2006 | Ptasinski ........................ 380/270 |
| 2006/0126845 A1* | 6/2006 | Zheng ............................ 380/270 |
| 2007/0036359 A1 | 2/2007 | Suzuki |
| 2007/0118742 A1* | 5/2007 | Abhishek et al. .............. 713/160 |
| 2007/0171870 A1* | 7/2007 | Oba et al. ....................... 370/331 |
| 2008/0132206 A1* | 6/2008 | Suzuki ........................... 455/411 |

FOREIGN PATENT DOCUMENTS

| | | |
|---|---|---|
| JP | 2001-237764 | 8/2001 |
| JP | 2004-180324 | 6/2004 |
| JP | 2004-241865 | 8/2004 |
| JP | 2004-260803 | 9/2004 |
| JP | 2004-266342 | 9/2004 |
| JP | 2004-274193 | 9/2004 |
| JP | 2004-289815 | 10/2004 |
| JP | 2005-64721 | 3/2005 |
| JP | 2005-64722 | 3/2005 |
| JP | 2006-094004 | 4/2006 |
| JP | 2007-74700 | 3/2007 |
| WO | WO 2006/020437 | 2/2006 |

OTHER PUBLICATIONS

DeCouto et al., "A High-Throughput Path Metric for Multi-Hop Wireless Routing", Proceedings of the 9$^{th}$ ACM International Conference on Mobile Computing and Networking (MobiCom '03), San Diego, California, Sep. 2003.

* cited by examiner

FIG. 4

| TERMINAL IDENTIFIER | AUTHENTICATION STATE |
|---|---|
| WIRELESS TERMINAL A | AUTHENTICATED |
| WIRELESS TERMINAL B | UNAUTHENTICATED |

FIG. 5

| TRANSMISSION-DESTINATION-TERMINAL IDENTIFIER | RELAY TERMINAL IDENTIFIER | AUTHENTICATION-SERVER METRIC |
|---|---|---|
| BRIDGE TERMINAL | WIRELESS TERMINAL A | 0 |
| WIRELESS TERMINAL A | WIRELESS TERMINAL A | 1 |
| WIRELESS TERMINAL B | WIRELESS TERMINAL B | 2 |

COMMUNICATION SYSTEM, WIRELESS-COMMUNICATION DEVICE, AND CONTROL METHOD THEREFOR

CROSS REFERENCES TO RELATED APPLICATIONS

The present invention contains subject matter related to Japanese Patent Application JP 2006-221719 filed in the Japanese Patent Office on Aug. 15, 2006, the entire contents of which are incorporated herein by reference.

BACKGROUND OF THE INVENTION

1. Field of the Invention

The present invention relates to a communication system and particularly relates to a communication system and a wireless-communication device, a communication-control method used therefor, and a program making a computer perform the communication-control method that are provided to authenticate the authority to access a wireless network.

2. Description of the Related Art

The infrastructure mode and the ad-hoc mode are known, as modes of forming a network by using a wireless technology. In the infrastructure mode, a network is formed under the centralized control of a wireless-communication device referred to as an access point (AP) or the like. On the other hand, in the ad-hoc mode, the centralized control is not performed by a specified access point, and asynchronous wireless communications are directly performed between arbitrary wireless-communication devices operating, as wireless terminals, so that a network is formed.

Methods of improving the security function of the above-described wireless networks have been proposed. For example, Japanese Unexamined Patent Application Publication No. 2004-180324 proposes a technology of applying an authentication system using an authentication server (AS) typified by Institute of Electrical and Electronics Engineers (IEEE) 802.1X to the infrastructure mode of IEEE802.11.

SUMMARY OF THE INVENTION

According to the known technologies, the AP used in the infrastructure mode functions, as authentication proxy provided to access the authentication server, and mediates an authentication-protocol sequence between the wireless terminal and the authentication server. An entity operating, as the authentication proxy provided to access the authentication server for a different wireless terminal in the above-described manner is referred to as an authenticator and an entity subjected to authentication processing via the authenticator is referred to as a supplicant.

On the other hand, since the role of each of wireless terminals is not determined explicitly in the ad-hoc mode, the roles of the wireless terminals should be determined by a standard of some kind. In that case, a wireless terminal that can access the authentication server may be selected, as the authenticator. However, there may be a plurality of the wireless terminals that can access the authentication server. If two wireless terminals performing authentication can access the authentication server, the roles of the two wireless terminals may be determined according to the value of each of media-access-control (MAC) addresses.

In the ad-hoc mode, however, each of wireless-communication devices may move and the wireless-communication quality of a path between the wireless-communication devices is not consistent. If the roles of the authenticator and the supplicant are determined and fixed in the above-described state, it is apprehended that an authentication message may be transferred through an inefficient authentication path eventually.

Therefore, it is desirable to determine the roles of the authenticator and the supplicant in consideration of a path leading to the authentication server.

Therefore, according to an embodiment of the present invention, there is provided a wireless-communication device performing mutual authentication between the wireless-communication device and a different wireless-communication device by using an authentication server. The wireless-communication device includes a communication-setting-data-retention unit configured to retain communication-setting data including a first metric corresponding to the path from the wireless-communication device to the authentication server, as a self-authentication-server metric, a signal-reception unit configured to receive a predetermined signal transmitted from the different wireless-communication device, the predetermined signal including a second metric corresponding to the path from the different wireless-communication device to the authentication server, as a nonself-authentication-server metric, and a control unit configured to make a first setting so that the wireless-communication device operates, as a supplicant, during the mutual authentication when the self-authentication-server metric is better than the nonself-authentication-server metric, and make a second setting so that the wireless-communication device operates, as an authenticator, during the mutual authentication when the self-authentication-server metric is worse than the nonself-authentication-server metric. Subsequently, the roles of the supplicant and the authenticator, the roles being played during the mutual authentication, are determined with reference to the metric corresponding to the path to the authentication server. Namely, a wireless-communication device having a path which makes it easier to access the authentication server becomes the authenticator, whereby the mutual authentication is performed with efficiency.

Further, in the above-described embodiment, the communication-setting data retained in the communication-setting-data-retention unit may include data on a first address of the wireless-communication device, the predetermined signal may include data on a second address of the different wireless-communication device, and when the self-authentication-server metric is equivalent to the nonself-authentication-server metric, the control unit may make a third setting so that the wireless-communication device operates, as either the authenticator or the supplicant, during the mutual authentication according to a relationship between the first address and the second address. More specifically, when the first address is larger than the second address, the control unit may make a fourth setting so that the wireless-communication device operates, as the authenticator, during the mutual authentication, and when the first address is not larger than the second address, the control unit may make a fifth setting so that the wireless-communication device operates, as the supplicant, during the mutual authentication. Subsequently, when the metrics corresponding to the paths to the authentication server are equivalent to each other, the roles of the supplicant and the authenticator, the roles being played during the mutual authentication, are determined according to the relationship between the addresses of the wireless-communication devices. Namely, even though it is difficult to determine the roles of the wireless-communication devices based on the metrics corresponding to the paths to the authentication server, the role determination can be made between the wireless-communication devices without contradiction.

Further, in the above-described embodiment, the predetermined signal may include first accessibility information indicating whether or not the different wireless communication device can make access to the authentication server, and the communication-setting data retained in the communication-setting-data-retention unit may include second accessibility information indicating whether or not the wireless-communication device can make access to the authentication server. Still further, in the above-described embodiment, when the first accessibility information shows that the different wireless-communication device can make access to the authentication server and the second accessibility information shows that the wireless-communication device makes access to the authentication server with difficulty, the control unit may make a sixth setting so that the wireless-communication device operates, as the supplicant, during the mutual authentication irrespective of a relationship between the self-authentication-server metric and the nonself-authentication-server metric, and when the first accessibility information shows that the different wireless-communication device makes access to the authentication server with difficulty and the second accessibility information shows that the wireless-communication device can make access to the authentication server, the control unit may make a seventh setting so that the wireless-communication device operates, as the authenticator, during the mutual authentication irrespective of the relationship between the self-authentication-server metric and the nonself-authentication-server metric. Subsequently, the roles of the supplicant and the authenticator, the roles being played during the mutual authentication, are determined according to whether or not access to the authentication server can be made.

Further, in the above-described embodiment, the first metric and/or the second metric may show the number of at least one hop of a wireless-communication path leading to the authentication server, and/or the wireless-communication quality of the wireless-communication path may be considered.

Further, in the above-described embodiment, when the control unit calculates a third metric corresponding to the path to the authentication server after the mutual authentication is achieved and the third metric is better than the self-authentication-server metric retained in the communication-setting-data-retention unit, the control unit may make the communication-setting-data-retention unit retain the third metric. Subsequently, the self-authentication-server metric can be updated.

Further, in the above-described embodiment, the wireless-communication device may further include a nonself-authentication-server-metric-retention unit provided for the different wireless-communication device, the nonself-authentication-server-metric-retention unit being configured to retain the nonself-authentication-server metric, and a neighboring-metric-acquisition unit configured to acquire a fourth metric provided between the wireless-communication device and the different wireless-communication device, as a neighboring metric, wherein the control unit may calculate the self-authentication-server metric by adding the nonself-authentication-server metric to the neighboring metric. Subsequently, the nonself-authentication-server-metric-retention unit is made to retain the nonself-authentication-server metric in advance through an AS announcement or the like, whereby the self-authentication-server metric is calculated. Further, when there is a plurality of the different wireless-communication devices, upon receiving the predetermined signal transmitted from each of the different wireless-communication devices, the signal-reception unit may make the nonself-authentication-server-metric-retention unit retain the nonself-authentication-server metric based on the predetermined signal including the nonself-authentication-server metric which is the best of the nonself-authentication-server metrics of all of the predetermined signals. Subsequently, upon receiving an AS announcement transmitted from each of different wireless-communication devices, the AS announcement being transmitted from a single bridge terminal operating, as a transmission source, the signal-reception unit makes the nonself-authentication-server-metric-retention unit retain the most appropriate nonself-authentication-server metric.

Further, according to another embodiment of the present invention, there is provided a communication system performing mutual authentication between at least two wireless-communication devices by using an authentication server, wherein each of the wireless-communication devices includes a communication-setting-data-retention unit configured to retain communication-setting data including a first metric corresponding to the path from the wireless-communication device to the authentication server, as a self-authentication-server metric, a signal-transmission unit configured to transmit a first signal including the self-authentication-server metric, a signal-reception unit configured to receive a second signal transmitted from the different wireless-communication device, the second signal including a second metric corresponding to the path from the different wireless-communication device to the authentication server, as a nonself-authentication-server metric, and a control unit configured to make a first setting so that the wireless-communication device operates, as a supplicant, during the mutual authentication when the self-authentication-server metric is better than the nonself-authentication-server metric, and make a second setting so that the wireless-communication device operates, as an authenticator, during the mutual authentication when the self-authentication-server metric is worse than the nonself-authentication-server metric. Subsequently, the roles of the supplicant and the authenticator, the roles being played during the mutual authentication, are determined with reference to the metric corresponding to the path to the authentication server.

According to an embodiment of the present invention, the state of a path leading to an authentication server will be reflected when the roles of an authenticator and a supplicant that are provided to perform authentication are determined.

BRIEF DESCRIPTION OF THE DRAWINGS

FIG. 4 shows an example configuration of a neighboring-terminal list according to an embodiment of the present invention;

FIG. 5 shows an example configuration of a routing table according to an embodiment of the present invention;

DESCRIPTION OF THE PREFERRED EMBODIMENTS

Next, embodiments of the present invention will be described in detail with reference to the attached drawings.

Figure 1:
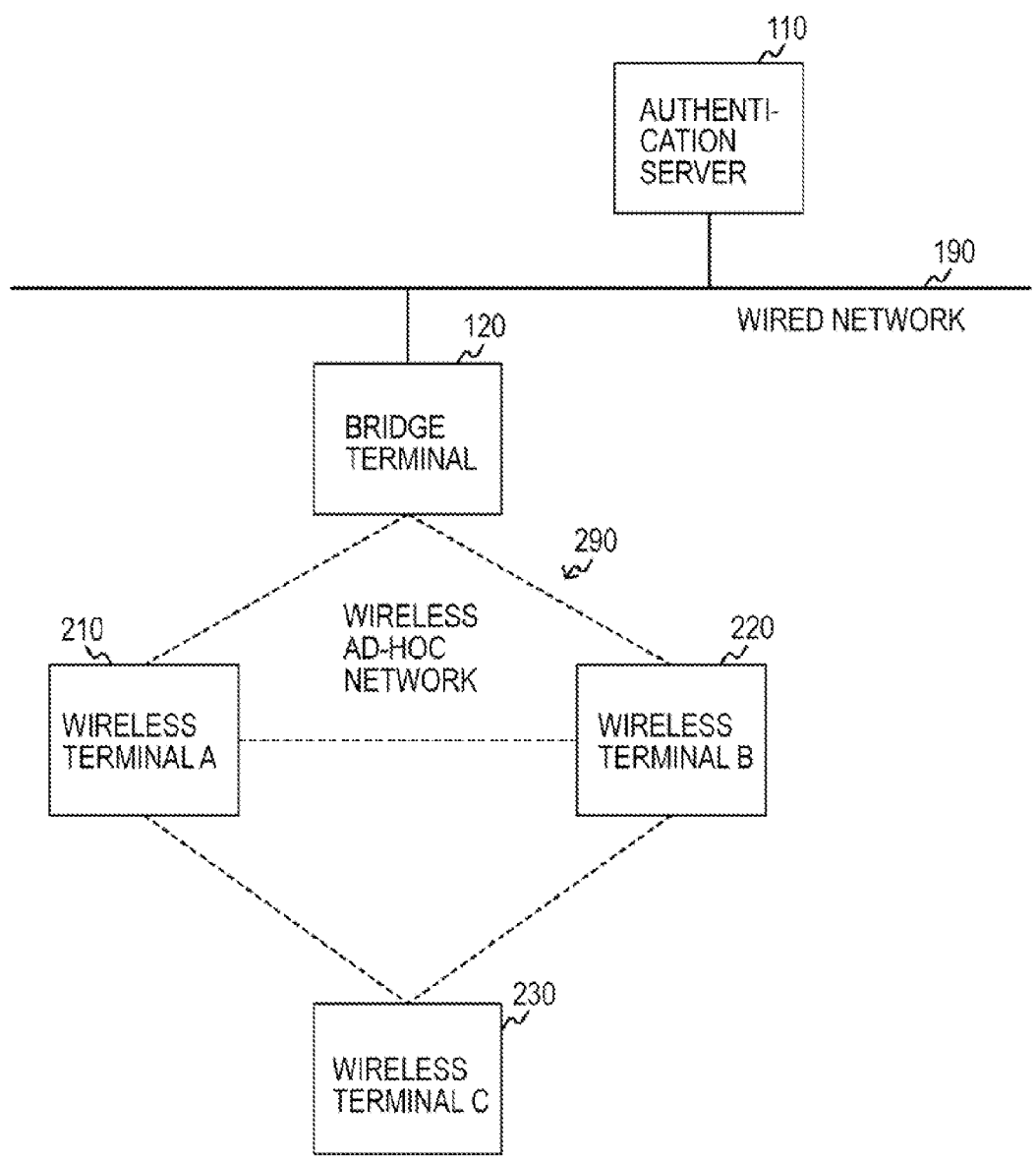
FIG. 1 shows an example configuration of a communication system according to an embodiment of the present invention.

FIG. 1 shows an example configuration of a communication system according to an embodiment of the present invention. The communication system includes a wired network 190 connecting an authentication server 110 and a bridge terminal 120 to each other, and a wireless ad-hoc network 290 connecting the bridge terminal 120, a wireless terminal A210, a wireless terminal B220, and a wireless terminal C230 to one another.

The authentication server 110 is configured to authenticate the access authority of a wireless terminal which is going to access the communication system. The authentication server 110 authenticates a wireless terminal operating, as a supplicant, via a wireless terminal operating, as an authenticator.

The bridge terminal 120 functions, as a bridge connecting the wired network 190 and the wireless ad-hoc network 290 to each other. The bridge terminal 120 functions, as a wired-communication device connected to the wired network 190, and functions, as a wireless-communication device included in the wireless ad-hoc network 290.

Each of the wireless terminals A210, B220, and C230 (hereinafter collectively referred to as a wireless terminal 200, as required), and the bridge terminal 120 function, as wireless-communication devices included in the wireless ad-hoc network 290.

When another wireless terminal is to be connected to the wireless ad-hoc network 290, mutual authentication is performed between the wireless terminal and different wireless terminals that had already been included in the wireless ad-hoc network 290. For example, when the wireless terminal C230 is to be connected to the wireless ad-hoc network 290, and the bridge terminal 120 and the wireless terminals A210 and B220 had already been included in the wireless ad-hoc network 290, mutual authentication is performed between the wireless terminal C230 and the wireless terminal A210, and the wireless terminal C230 and the wireless terminal B220.

Before the above-described mutual authentication is performed, the wireless terminals transmit and/or receive beacons (broadcast signals) to and/or from one another. When the wireless terminal C230 receives the beacon transmitted from the wireless terminal A210 before receiving the beacon transmitted from the wireless terminal B220, the mutual authentication is performed between the wireless terminals A210 and C230. During the mutual authentication, one of the wireless terminals A210 and C230 operates, as an authenticator, and the other operates, as a supplicant. At that time, it is difficult for the wireless terminal C230 to connect to the authentication server 110. Therefore, the wireless terminal A210 operates, as the authenticator and the wireless terminal C230 operates, as the supplicant. Namely, the wireless terminal A210 functions, as authentication proxy of the authentication server 110 so that the wireless terminal C230 is authenticated. As a result, an authenticated link is formed between the wireless terminals A210 and C230.

After that, when the wireless terminal C230 receives the beacon transmitted from the wireless terminal B220, mutual authentication is performed between the wireless terminals B220 and C230. At that time, a link had already been made between the wireless terminal C230 and the authentication server 110. Therefore, either of the wireless terminals B220 and C230 can operate, as the authenticator. According to the above-described embodiment of the present invention, a path extending the wireless terminal B220 to the authentication server 110 and a path from the wireless terminal C230 to the authentication server 110 are compared to each other. Subsequently, the wireless terminal having a path which allows easier access to the authentication server 110 is determined to be the authenticator.

A metric functions, as the standard of the "path which allows easier access to the authentication server 110" is referred to as an "authentication-server metric". As the authentication-server metric, for example, the number of hops of a wireless-communication path extending to the authentication server 110, namely, the number of hops used to reach the bridge terminal 120 can be used, as the authentication-server metric. In that case, the less the number of hops of the path (the better the authentication-server metric), the easier it becomes to access the authentication server. According to the above-described embodiment, the wireless terminal B220 has an authentication-server metric better than that of the wireless terminal C230.

Further, the authentication-server metric may be not only the number of hops of a wireless-communication path extending to the authentication server, but also a value including the value of the wireless-communication quality of each of links of the path. For example, an expected transmission count (ETX) suggested for a path-control protocol may be used, as the authentication-server metric. The ETX is a value obtained based on interactive delivery ratios obtained through wireless terminals transmitting and/or receiving a probe request and a probe response to and/or from one another (D. Couto, et al.: "A High-Throughput Path Metric for Multi-Hop Wireless Routing", Proc. of the 9th ACM International Conference on Mobile Computing and Networking (MobiCom '03), September 2003).

Further, the wireless-communication quality that can be used for the authentication-server metric may be the number of frame retransmission, the transmission-queue length, the radio-wave intensity, and so forth.

Figure 2:
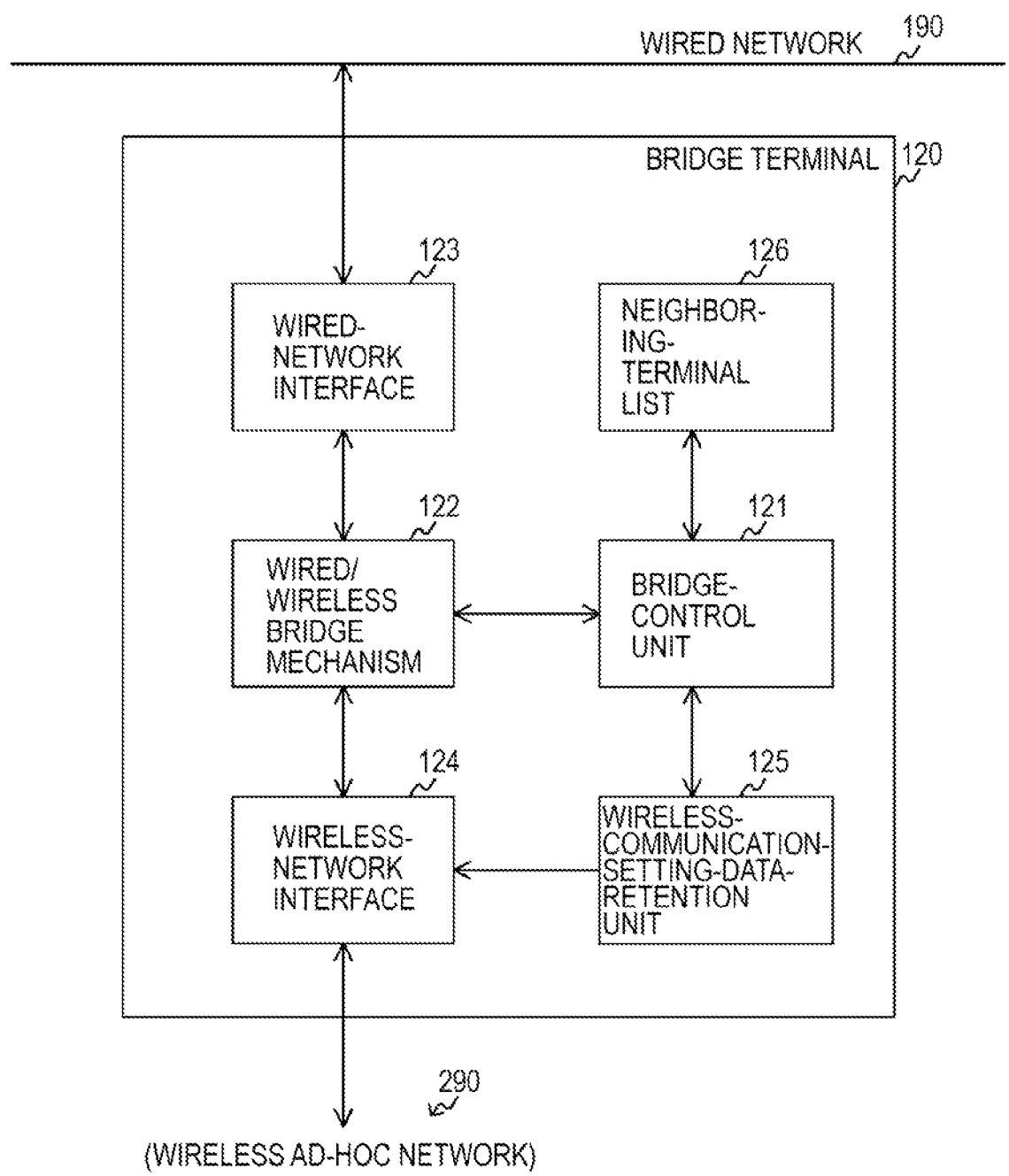
FIG. 2 shows an example configuration of a bridge terminal according to an embodiment of the present invention.

FIG. 2 shows an example configuration of the bridge terminal 120 according to the above-described embodiment. The bridge terminal 120 includes a bridge-control unit 121, wired/wireless-bridge mechanism 122, a wired-network interface 123, a wireless-network interface 124, a wireless-communication-setting-data-retention unit 125, and a neighboring-terminal list 126.

The bridge-control unit 121 controls the entire bridge terminal 120. The wired/wireless-bridge mechanism 122 performs protocol conversion for the wired network 190 and the wireless ad-hoc network 290. The wired-network interface 123 is an interface used for transmitting and/or receiving data between the wired network 190 and the bridge terminal 120. The wireless-network interface 124 is an interface used for transmitting and/or receiving data between the wireless ad-hoc network 290 and the bridge terminal 120.

The wireless-communication-setting-data-retention unit 125 is configured to retain setting data used for performing wireless communications. For example, a service-set identifier (SSID), security-setting data, the MAC address of the bridge terminal 120, and so forth are retained, as the setting data. Here, the SSID is an identifier used for identifying the wireless ad-hoc network 290. For example, an arbitrary character string input by a user is used, as the SSID. Further, a code, an identifier, and so forth used for a robust security network (RSN) can be retained, as the security-setting data.

The neighboring-terminal list 126 is a list of wireless terminals operating on the wireless ad-hoc network 290, the wireless terminals existing in the vicinity of the bridge terminal 120. Upon receiving beacons transmitted from the wireless terminals at regular intervals, the bridge-control unit 121 performs control so that the neighboring-terminal list 126 shows the latest state.

Figure 3:
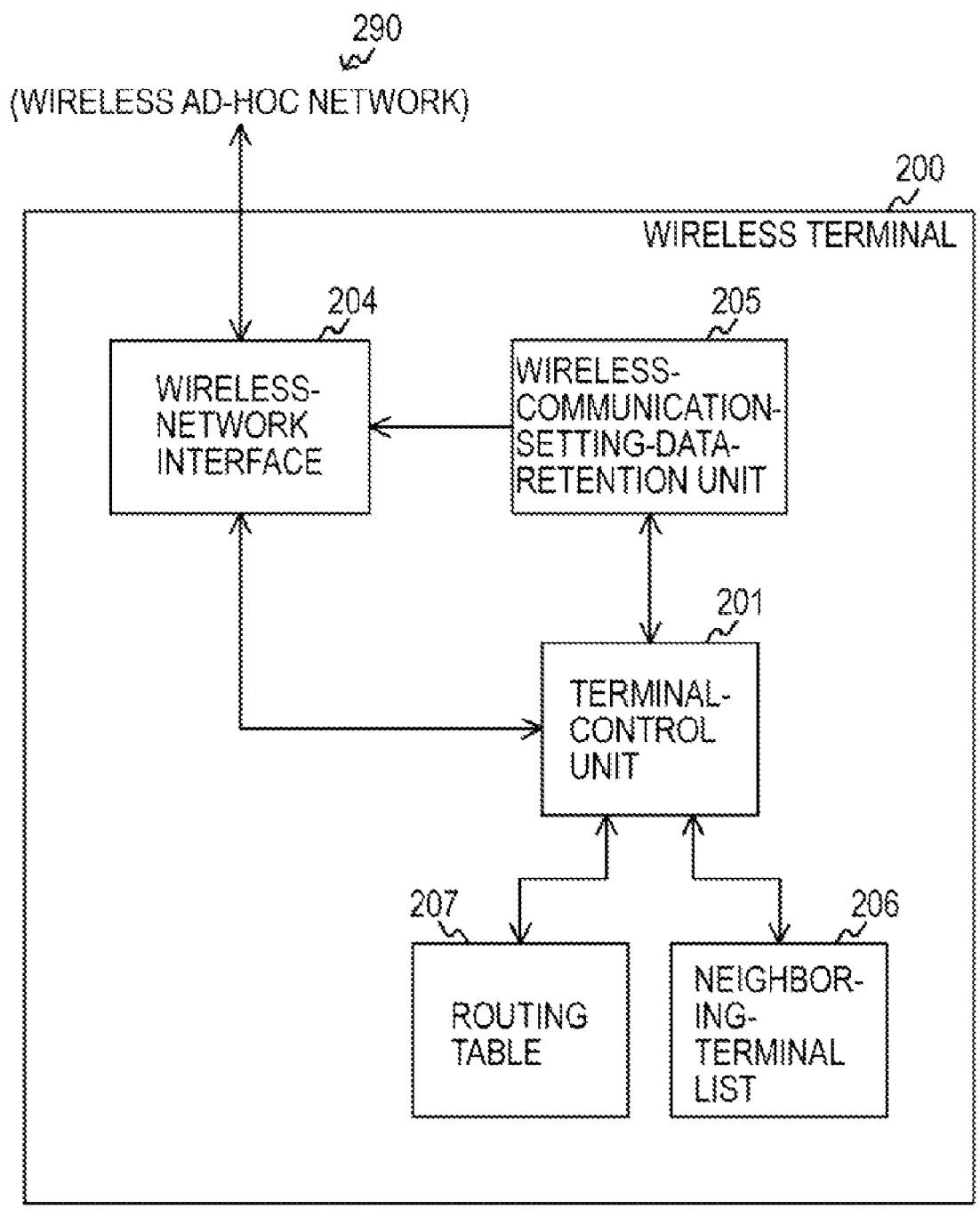
FIG. 3 shows an example configuration of a wireless terminal according to an embodiment of the present invention.

FIG. 3 shows an example configuration of the wireless terminal 200 according to the above-described embodiment. The wireless terminal 200 includes a terminal-control unit 201, a wireless-network interface 204, a wireless-communication-setting-data-retention unit 205, a neighboring-terminal list 206, and a routing table 207.

The terminal-control unit 201 controls the entire wireless terminal 200. The wireless-network interface 204 is an interface used for transmitting and/or receiving data between the wireless ad-hoc network 290 and the wireless terminal 200.

The wireless-communication-setting-data-retention unit 205 is configured to retain setting data used for performing wireless communications. For example, an SSID used to identify the wireless ad-hoc network 290, security-setting data including a code, an identifier, and so forth that are used for the RSN, the MAC address of the wireless terminal 200, the current identification-server metric of the wireless terminal 200, and so forth are retained, as the setting data.

The neighboring-terminal list 206 is a list of wireless terminals operating on the wireless ad-hoc network 290, the wireless terminals existing in the vicinity of the wireless terminal 200. Upon receiving beacons transmitted from different wireless terminals at regular intervals, the bridge-control unit 201 performs control so that the neighboring-terminal list 206 shows the latest state.

The routing table 207 is a table including the list of paths of the wireless ad-hoc network 290, the paths extending to the bridge terminal 120 and/or the different wireless terminals.

FIG. 4 shows an example configuration of a neighboring-terminal list 610 according to an embodiment of the present invention. The neighboring-terminal list 610 corresponds to the neighboring-terminal list 126 of the bridge terminal 120 and/or the neighboring-terminal list 206 of the wireless terminal 200.

The neighboring-terminal list 610 retains data on a terminal identifier 611 of each of wireless terminals in the neighborhood of the bridge terminal 200 and/or the wireless terminal 200 (hereinafter referred to as neighboring terminals) and data on an authentication state 612 between the bridge terminal 200 and/or the wireless terminal 200, and each of the neighboring terminals.

The terminal identifier 611 of each of the neighboring terminals may be the MAC address of the wireless terminal corresponding to the neighboring terminal. Further, a flag indicating whether or not mutual authentication is finished between the bridge terminal 200 and/or the wireless terminal 200, and the wireless terminal is shown, as the authentication state 612. More specifically, the flag is shown, as "authenticated", or "unauthenticated".

FIG. 5 shows an example configuration of a routing table 620 according to an embodiment of the present invention. The routing table 620 corresponds to the routing table 207 of the wireless terminal 200. The routing table 620 retains data on a terminal identifier 621 of a wireless terminal which becomes the final transmission destination during the frame transmission (hereinafter referred to as a transmission-destination terminal), a terminal identifier 622 of a wireless terminal relaying a frame which is to be transmitted to the transmission-destination terminal (hereinafter referred to as a relay terminal), and an authentication-server metric 623 used to transmit data from the transmission-destination terminal to the authentication server 110. The routing table 620 retains the data on the terminal identifier 621, the terminal identifier 622, and the authentication-server metric 623 for each of the transmission-destination terminals.

The transmission-destination-terminal identifier 621 and the relay terminal 622 may be the MAC address of the corresponding wireless terminal, for example. Further, the authentication-server metric 623 may be the number of hops of a path leading to the bridge terminal 120 and/or a value including the wireless-communication quality of each of links of the path.

At the data-transmission time, routing is performed on the basis of the routing table 620. For example, when data is transmitted to the bridge terminal, a search is made for the terminal identifier of the bridge terminal in the field of the transmission-destination-terminal identifier 621, and the terminal identifier of the wireless terminal A corresponding to the bridge terminal is acquired, where data on the wireless terminal A is retained in the relay-terminal identifier 622. Subsequently, user can learn that the wireless terminal A should be used, as the relay terminal, so as to transmit data to the bridge terminal.

Figure 6:
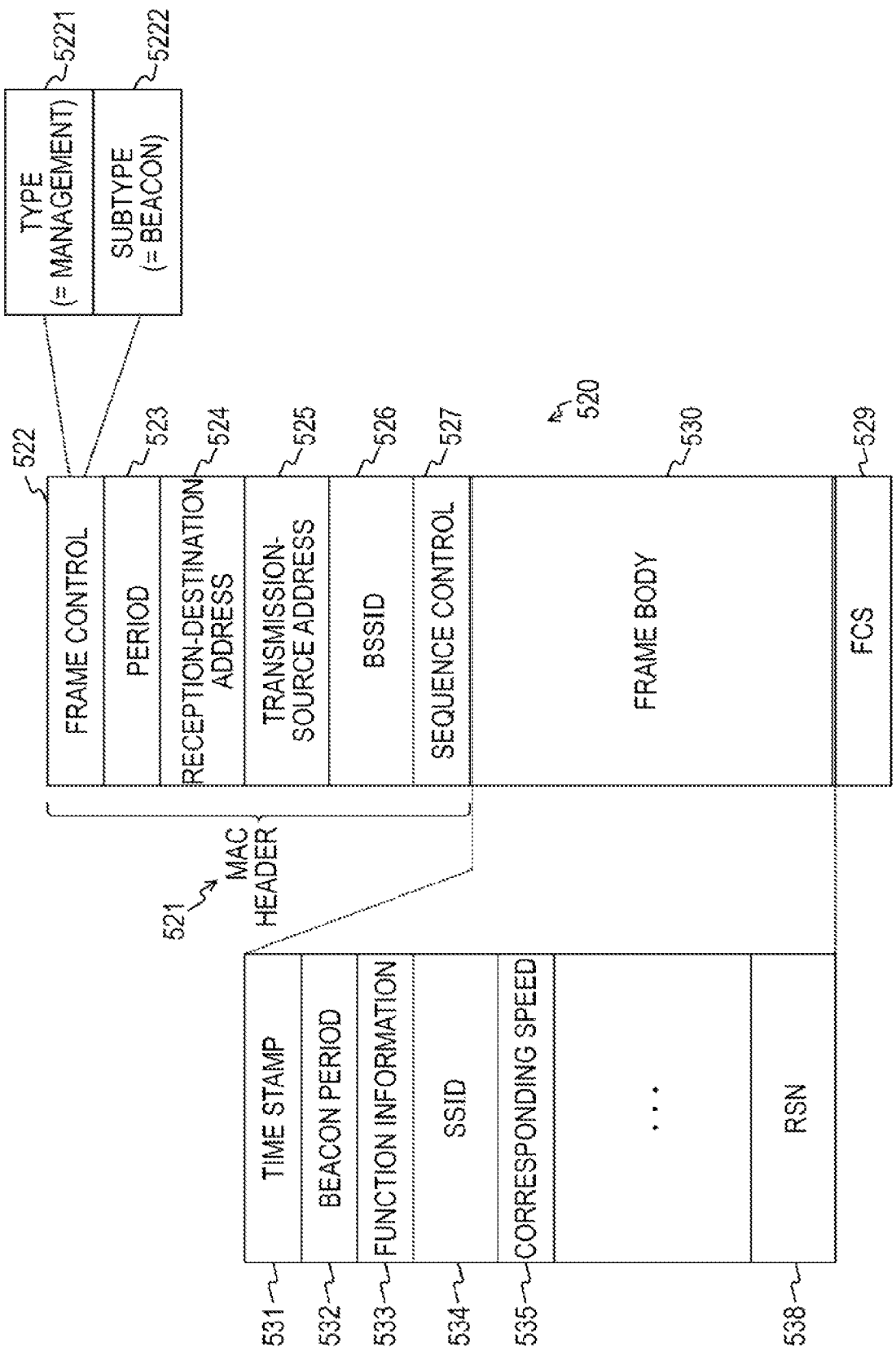
FIG. 6 shows the format of a beacon frame generated by the Institute of Electrical and Electronics Engineers (IEEE) 802.11 standard.

FIG. 6 shows the format of a beacon frame generated by the Institute of Electrical and Electronics Engineers (IEEE) 802.11 standard. A beacon frame 520 is used to transmit beacon information of a MAC sub layer. The beacon frame 520 includes a MAC header 521, a frame body 530, and a frame check sequence (FCS) 529. The MAC header 521 includes data on a frame control 522, a period 523, a reception-destination address 524, a transmission-source address 525, a basic-service-set identifier (BSSID) 526, and a sequence control 527.

The frame control 522 is a field showing control information about a frame and includes information about the kind of the frame and/or the communication mode. A type 5221 included in the frame control 522 shows the type of the frame. Further, a sub type 5222 shown in the frame control 522 shows the sub type of the frame. According to the above-described beacon frame, the frame type is a management frame, and the sub type is a beacon frame.

The period 523 is a field showing a reserved time required to finish the frame transmission.

The transmission-source address 525 indicates the address of a wireless terminal existing on the transmission side. For example, a terminal identifier can be used, as the transmission-source address 525. Further, the reception-destination address 524 indicates the address of a wireless terminal existing on the reception side. In the case where the beacon frame 520 is used, a broadcast address is used, as the reception-destination address 524.

The BSSID 526 is provided to retain data on a basic-service-set identifier (BSSID) defined by the IEEE 802.11 standard. In the ad-hoc mode, the MAC address of the first wireless terminal started on a network to which the wireless terminal belongs is used.

The sequence control 527 is a field showing the fragment number used when data is divided into fragments and the sequence number.

The frame body 530 corresponds to the payload of the beacon frame 520 and is used to transfer data existing in the MAC-sub layer. The FCS 529 is a field used to detect an error occurring in the beacon frame 520. In the FSC 529, 1's complement of the remainder of a remainder calculation of a generator polynomial is set.

The beacon frame 520 includes data on a time stamp 531, a beacon period 532, function information 533, an SSID 534, corresponding speed 535, an RSN 538, and so forth, as the frame body 530.

The time stamp 531 shows the value of a timer used for a time-synchronization function in microseconds. The beacon period 532 shows the period in which a beacon frame is transmitted in microseconds.

The function information 533 shows various types of information relating to a point-coordination function (PCF), data encryption, and so forth. The function information 533 includes information about network-operation mode indicating whether a wireless terminal which transmits data is a basic-service set (BSS) under the control of an access point used in infrastructure mode, or an independent-basic-service set (IBSS) used in the ad-hoc mode.

The SSID 534 shows a service-set identifier used to identify the wireless ad-hoc network 290. The corresponding speed 535 shows the list of supported wireless-transfer rates. The RSN 538 is a field provided to retain information including a code, an identifier, and so forth that are used for the RSN.

Figure 7:
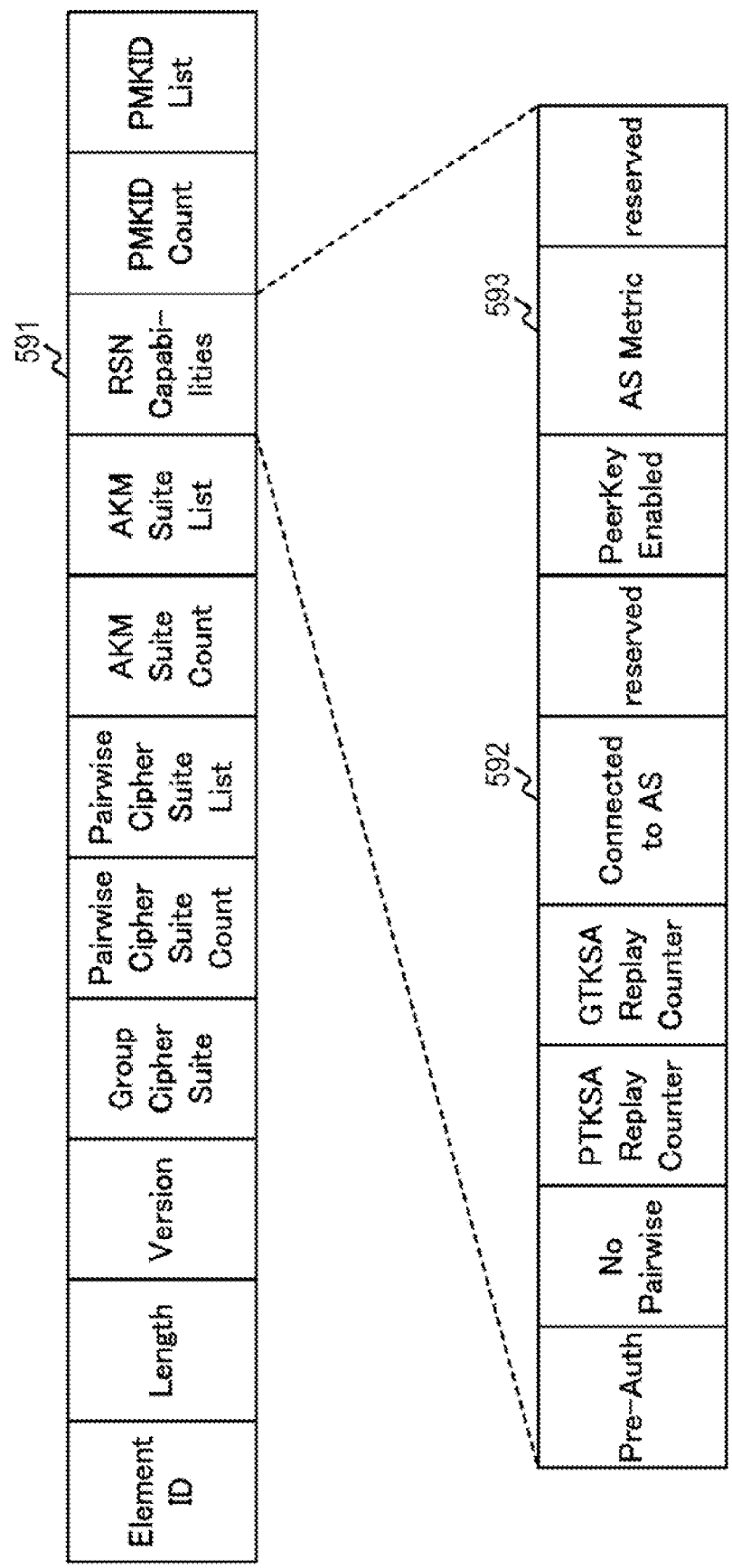
FIG. 7 shows example data items included in an RSN field according to an embodiment of the present invention.

FIG. 7 shows example data items included in an RSN field according to an embodiment of the present invention. The RSN 538 of the beacon frame 520 retains security-setting data including a code, an identifier, and so forth that are used to make a network robust. According to an embodiment of the present invention, the field of Connected-to-AS 592 and that of authentication-server metric (AS metric) 593 are provided in a reserve area of RSN Capabilities 591 of the RSN 538. Subsequently, each of wireless terminals is informed of the connectivity of a different wireless terminal to the authentication server 110 and/or the metric of a path leading to the authentication server 110 through the beacon frame 520.

The Connected-to-AS 592 is a field provided to show whether or not the wireless terminal which transmits the beacon frame 520 can be connected to the authentication server 110 via the wired network 190 and the wireless ad-hoc network 290. If no mutual authentication is performed between the above-described wireless terminal and any of the wireless terminals operating on the wireless ad-hoc network 290, the wireless terminal is not connected to the authentication server 110.

The authentication-server metric 593 is a field showing the authentication-server metric of a path extending from the wireless terminal which transmits the beacon frame 520 to the authentication server 110. Upon receiving the beacon frame 520, the wireless terminal 200 compares the current authentication-server metric retained in the wireless-communication-setting-data-retention unit 205 to the transmitted authentication-server metric 593, whereby it is determined whether the wireless terminal 200 should be an authenticator or a supplicant.

In the above-described embodiment, a passive-scan system is used so that the wireless terminals transmit beacon frames at regular intervals and/or receive the transmitted beacon frames to and/or from one another. However, another system can be used. For example, according to an embodiment of the present invention, in response to a probe request (shown in FIG. 8) transmitted from a predetermined wireless terminal, each of wireless terminals surrounding the predetermined wireless terminal transmits necessary information, as a probe response (shown in FIG. 9). The above-described system is referred to as the active-scan system.

Figure 8:
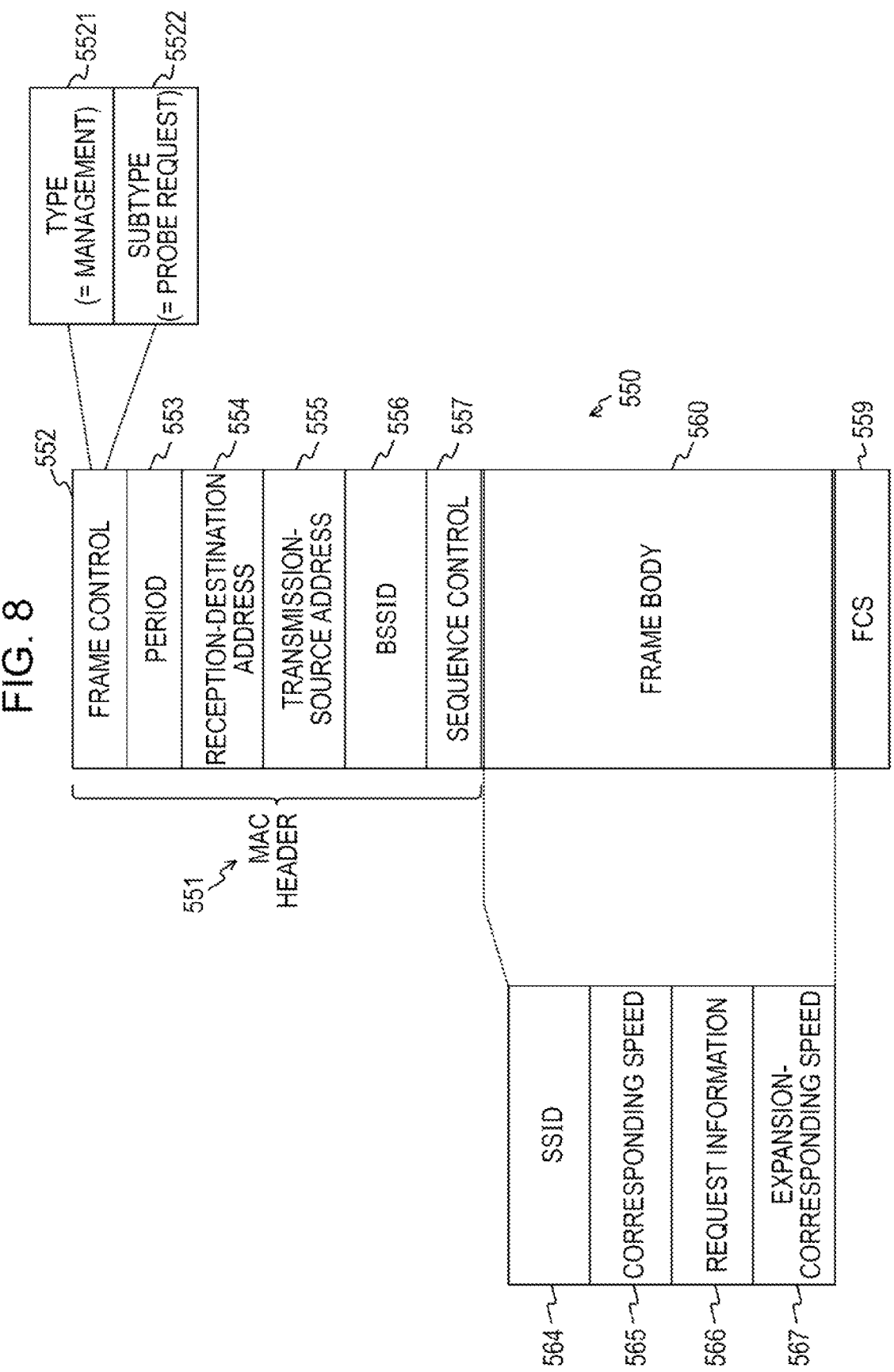
FIG. 8 shows the format of a probe-request frame generated by the IEEE 802.11 standard.

FIG. 8 shows the format of a probe-request frame 550 generated by the IEEE 802.11 standard. A wireless-communication system may include a wireless terminal which transmits no beacon frame. The above-described wireless terminal can make a search request by transmitting the above-described probe-request frame 550.

The probe-request frame 550 is provided to transmit a probe request generated in the MAC sub layer and includes a MAC header 551, a frame body 560, and an FCS 559. The MAC header 551 and the FCS 559 have the same configurations as those of the MAC header 521 and the FCS 529 of the beacon frame 520 shown in FIG. 6. However, a subtype 5522 shows the probe request.

Further, the frame body 560 corresponds to the payload of the probe-request frame 550 and is used to transfer data generated in the MAC sub layer. The frame body 560 includes data on an SSID 564, corresponding speed 565, request information 566, expansion-corresponding speed 567, and so forth. The frame body 560 has a configuration similar to that of the beacon frame 520 shown in FIG. 6.

Figure 9:
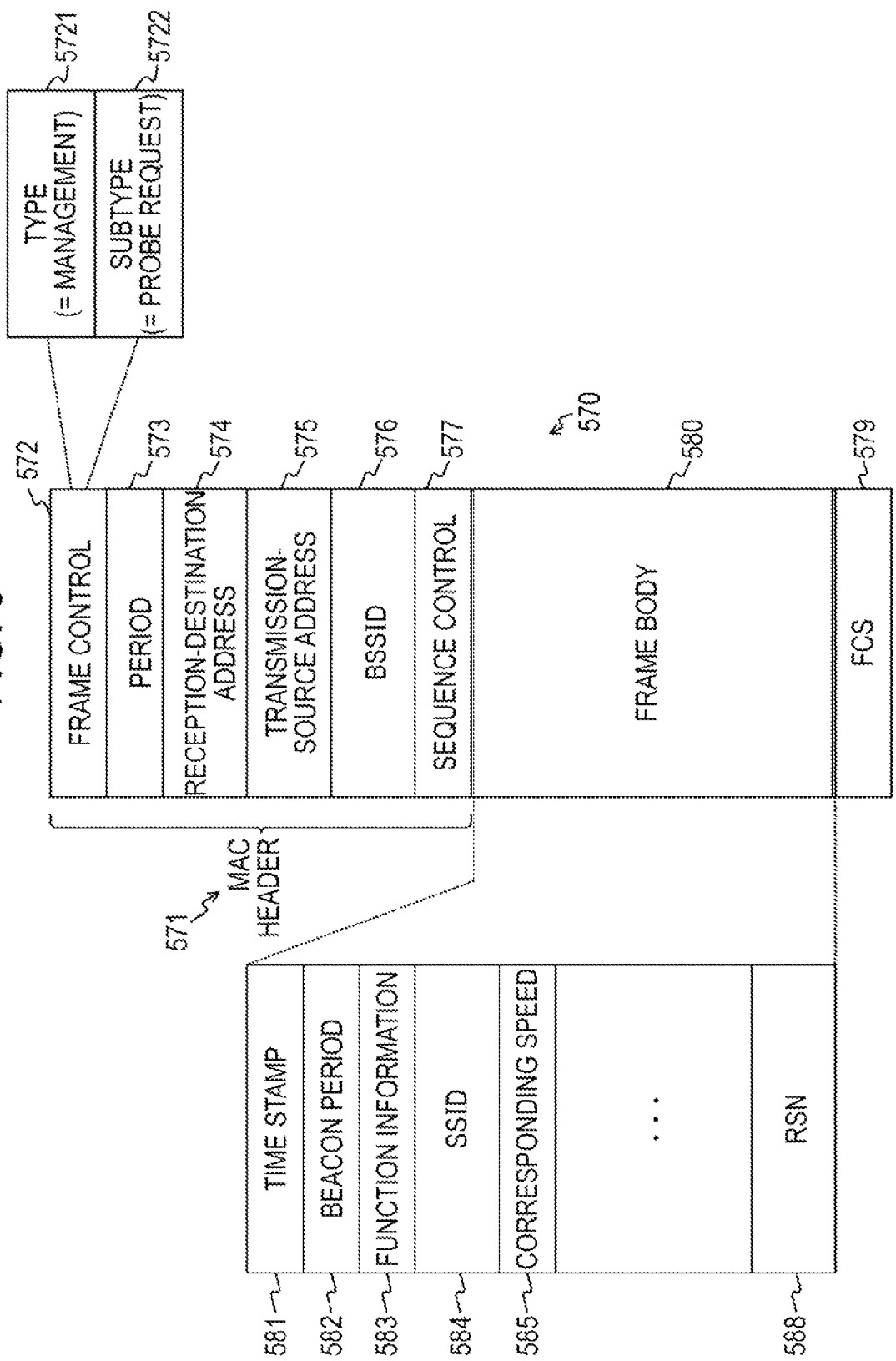
FIG. 9 shows the format of a probe-response frame generated by the IEEE 802.11 standard.

FIG. 9 shows the format of a probe-response frame 570 generated by the IEEE 802.11 standard. The probe-response frame 570 is used by a wireless terminal to which the probe-request frame 550 had been transmitted, so as to respond to the probe-request frame 550.

The probe-response frame 570 is used to transmit a probe response generated in the MAC sub layer and includes data on a MAC header 571, a frame body 580, and an FCS 579. Here, the MAC header 571 and the FCS 579 have the same configurations as those of the MAC header 521 and the FCS 529 of the beacon frame 520 shown in FIG. 6. However, a subtype 5722 shows the probe response.

Further, the frame body 580 corresponds to the payload of the probe-request frame 570 and is used to transfer data existing in the MAC sub layer. The frame body 580 includes data on a time stamp 581, a beacon period 582, function information 583, an SSID 584, corresponding speed 585, RSN 588, and so forth, and has the same configuration as that of the beacon frame 520 shown in FIG. 6.

Next, operations of the wireless terminal 200 according to an embodiment of the present invention will be described with reference to the attached drawings.

Processing procedures are performed when the bridge terminal 120 is connected to the authentication server 110 via the wired network 190. Upon being started, the bridge terminal 120 enables the wireless-network interface 124 and starts transmitting the beacon frame 520. Further, upon receiving the probe-request frame 550 transmitted from a wireless terminal, the bridge terminal 120 transmits the probe-response frame 570. At that time, in the field of the RSN-function information 591 of the beacon frame 520 and/or the probe-response frame 570, data reading as "with connectivity" is set in the field of the Connected-to-AS 592, and data reading as "0" is set in the field of the authentication-server metric 593.

On the other hand, the wireless terminal 200 enables the wireless-network interface 204 after a host computer is started, whereby transmission of the beacon frame 520 is started and/or the probe-request frame 550 is transmitted. At that time, in the field of the RSN-function information 591 of the beacon frame 520, data reading as "without connectivity" is set in the field of the Connected-to-AS 592, and the most inferior value is set in the field of the authentication-server metric 593.

Figure 10:
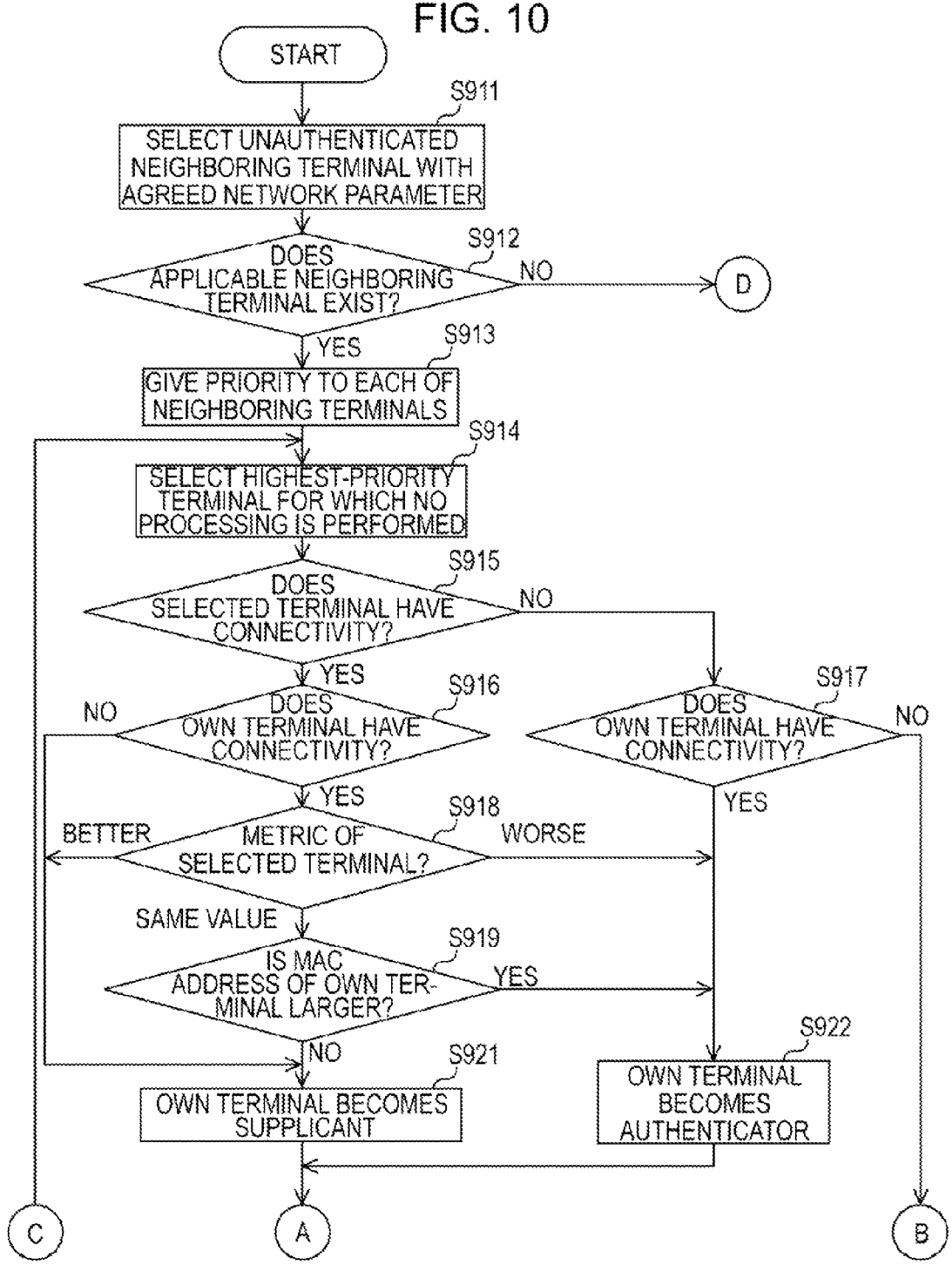
FIG. 10 shows the first half of example processing procedures performed by a wireless terminal according to an embodiment of the present invention.
Figure 11:
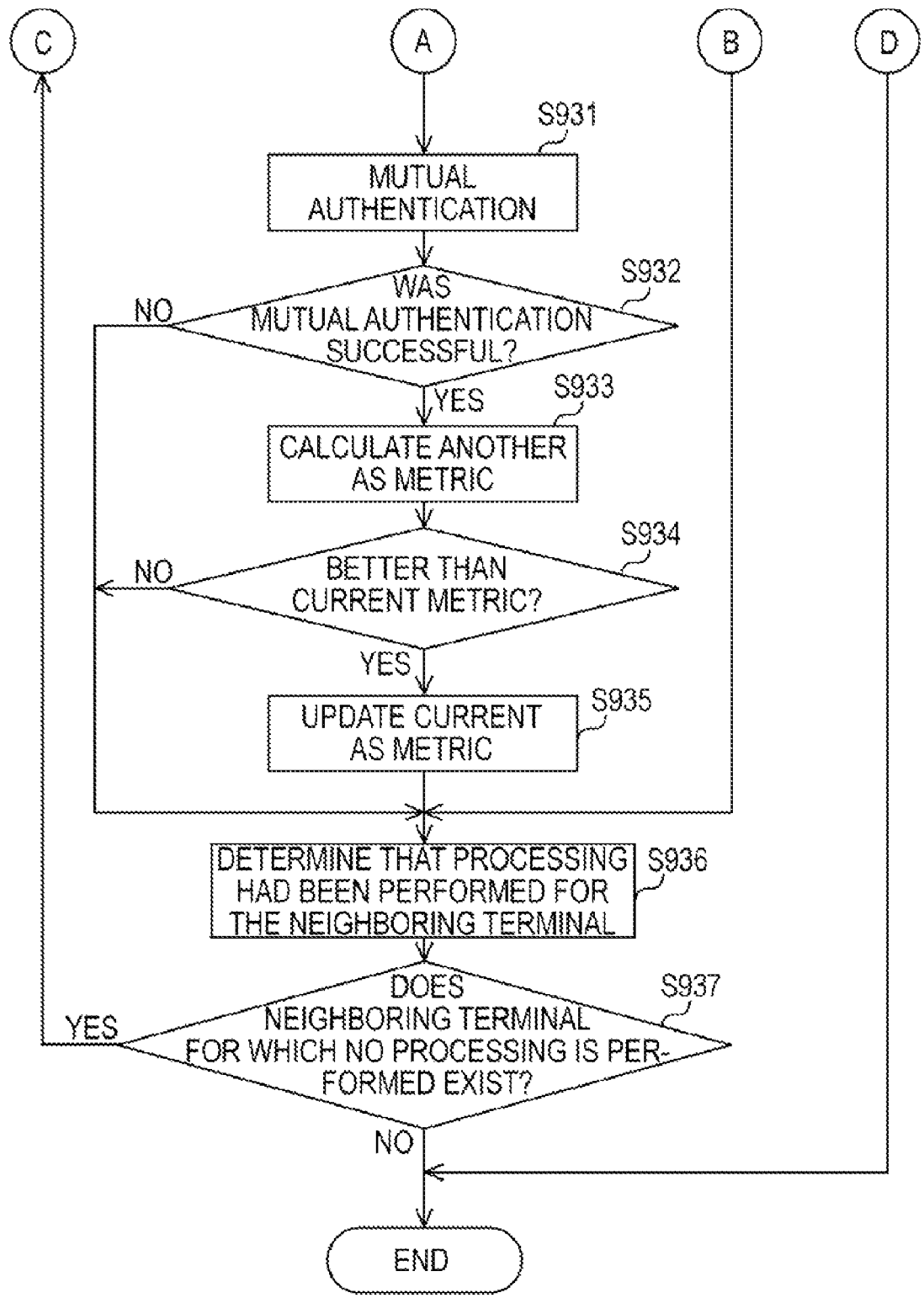
FIG. 11 shows the latter half of the example processing procedures performed by the wireless terminal.

Each of FIGS. 10 and 11 shows example processing procedures performed by the wireless terminal 200 according to an embodiment of the present invention. Upon receiving the beacon frames 520 and/or the probe-response frames 570 transmitted from different wireless-communication devices, the wireless terminal 200 selects an unauthenticated neighboring terminal having network parameters agreeing with those of the wireless terminal 200, at step S911. The term "network parameters" denotes an SSID, network-operation mode, security-setting data, and so forth. Namely, the wireless terminal 200 compares network parameters included in the SSID 534, the function information 533, and the RSN 538 of the beacon frame 520 and/or the SSID 584, the function information 583, and the RSN 588 of the probe-response frame 570 to the wireless-communication-setting data retained in the wireless-communication-setting-data-retention unit 205. Further, the wireless terminal 200 can determine whether or not the neighboring terminal is authenticated by referring to the authentication state 612 corresponding to the terminal identifier 611 shown on the neighboring-terminal list 610 based on the transmission-source address 525 of the beacon frame 520 and/or the transmission-source address 575 of the probe-response frame 570.

As a result, if the wireless terminals corresponding to "unauthenticated neighboring terminals with agreed network parameters" exist, the following processing procedures are performed. First, priority is given to each of the neighboring terminals, at step S913, and the wireless terminals are selected in decreasing order of priority so that processing is performed for the selected wireless terminals, at step S914. Here, the priority of each of the wireless terminals is determined so that the highest priority is given to a neighboring terminal of which Connected-to-AS 592 of the RSN-function information 591 of the beacon frame 520 and/or the probe-response frame 570 shows the data reading as "with connectivity". If there is a plurality of the wireless terminals whose Connected-to-AS 592 show the data reading as "with connectivity", the highest priority is given to a neighboring terminal having the most appropriate authentication-server metric 593 included in the RSN-function information 591 of the beacon frame 520 and/or the probe-response frame 570.

Then, at step S915, if the Connected-to-AS 592 included in the RSN-function information 591 of the beacon frame 520 and/or the probe-response frame 570 transmitted from the selected neighboring terminal shows the data reading as "with connectivity", the processing advances to step S916. On the other hand, if the Connected-to AS 592 shows the data reading as "without connectivity", the processing advances to step S917.

When the Connected-to-AS 592 of the selected neighboring terminal shows the data reading as "without connectivity" and the wireless terminal 200 can be connected to the authentication server 110, at step S917, it is determined that the wireless terminal 200 should operate, as an authenticator during mutual authentication, at step S922. Here, the connectivity between the wireless terminal 200 and the authentication server 100 will be described, as below. If there is a neighboring terminal whose authentication state 612 shown on the neighboring-terminal list 206 shows data reading as "authenticated", the wireless terminal 200 can be connected to the authentication server 110. If there is no neighboring terminal whose authentication state 612 shows the data reading as "authenticated", it is difficult to connect the wireless terminal 200 to the authentication server 110 with difficulty. On the other hand, if the Connected-to-AS 592 of the selected neighboring terminal shows the data reading as "with connectivity" and it is difficult to connect the wireless terminal 200 to the authentication server 110, at step S916, it is determined that the wireless terminal 200 should operate, as a supplicant, during the mutual authentication, at step S921. Namely, when the Connected-to-AS 592 of the selected neighboring terminal shows the data reading as "without connectivity", or when it is difficult to connect the wireless terminal 200 to the authentication server 110, the wireless terminal provided with the connectivity is determined to be the authenticator and the wireless terminal provided with no connectivity is determined to be the supplicant.

Further, when the Connected-to-AS 592 of the selected neighboring terminal show the data reading as "without connectivity" and it is difficult to connect the wireless terminal 200 to the authentication server 110, at step S917, the mutual authentication is not performed between the wireless terminals.

When the Connected-to-AS 592 of the selected neighboring terminal shows the data reading as "with connectivity" and when the wireless terminal 200 can be connected to the authentication server 110, at step S916, the roles played by the terminals during the mutual authentication are determined according to the relationship between the authentication-server metric 593 Of the RSN-function information 591 of the beacon frame 520 and/or the probe-response frame 570 transmitted from the selected neighboring terminal and the current authentication-server metric of the wireless terminal 200, the authentication-server metric being retained in the wireless-communication-setting-data-retention unit 205, at step S918.

Namely, when the authentication-server metric 593 of the selected neighboring terminal is better than the current authentication-server metric of the wireless terminal 200, it is determined that the wireless terminal 200 should operate, as the supplicant, during the mutual authentication, at step S921. On the other hand, when the authentication-server metric 593 of the selected neighboring terminal is worse than the current authentication-server metric of the wireless terminal 200, it is determined that the wireless terminal 200 should operate, as the authenticator, during the mutual authentication, at step S922.

Further, when the value of the authentication-server metric 593 of the selected neighboring terminal is the same as that of the current authentication-server metric of the wireless terminal 200, the roles played by the terminals during the mutual authentication are determined based on the sizes of the MAC addresses, at step S919. Namely, when the MAC address of the wireless terminal 200 is larger than that of the selected neighboring terminal, it is determined that the wireless terminal 200 should operate, as the authenticator, during the mutual authentication, at step S922. If the MAC address of the wireless terminal 200 is not larger than that of the selected neighboring terminal, it is determined that the wireless terminal 200 should operate, as the supplicant, during the mutual authentication, at step S921. Further, the MAC address of the selected neighboring terminal can be acquired from the transmission-source address 525 and/or the transmission-source address 575 of the transmitted beacon frame 520 and/or the transmitted probe-response frame 570, and/or the terminal identifier 611 shown on the neighboring-terminal list 206. The MAC address of the wireless terminal 200 can be acquired from the wireless-communication-setting-data-retention unit 205.

Further, when the wireless terminal 200, which is one of wireless terminals performing the mutual authentication, is determined to be the authenticator, the other wireless terminal is determined to be the supplicant. When the wireless terminal 200 is determined to be the supplicant, the other wireless terminal becomes the authenticator.

After the roles played by the wireless terminals during the mutual authentication are determined, the mutual authentication is performed between the selected neighboring terminal and the wireless terminal 200, at step S931. When the mutual authentication is achieved, at step S932, the wireless terminal that had shown no connectivity to the authentication server 110 by then can be connected to the authentication server 110 via the wireless terminal operating, as the authenticator. Then, a different authentication-server metric used to connect to the authentication server 110 is calculated by both the wireless terminals, at step S933. More specifically, the metric from the neighboring terminal to the wireless terminal 200 is added to the authentication-server metric 593 of the beacon frame 520 and/or the probe-response frame 570 transmitted from the neighboring terminal, whereby the different authentication-server metric is calculated.

When the different authentication-server metric calculated in the above-described manner is better than the current authentication-server metric of the wireless terminal 200, the current authentication-server metric being retained in the wireless-communication-setting-data-retention unit 205, at step S934, the contents of the wireless-communication-setting-data-retention unit 205 are updated through the different authentication-server metric, at step S935. Namely, the wireless-communication-setting-data-retention unit 205 retains the calculated different authentication-server metric, as the current authentication-server metric of the wireless terminal 200. Subsequently, the calculated different authentication-server metric is shown in the field of the authentication-server metric 593 of the beacon frame 520 and/or the probe-response frame 570 transmitted from the wireless terminal 200.

After the above-described processing procedures are performed for a specified neighboring terminal, the neighboring terminal is determined to be a terminal that had been subjected to the processing procedures, at step S936. If a neighboring terminal that is not subjected to the processing procedures exists, at step S937, a neighboring terminal with the second highest priority is selected, at step S914, and the above-described processing procedures are performed again.

In the wireless ad-hoc network, the topology may change dynamically due to the entry and/or withdraw of a wireless terminal. Therefore, it is preferable that the authentication-server metric retained by the wireless-communication-setting-data-retention unit 205 be updated every time another authentication-server metric is acquired through a routing protocol operating in the terminal-control unit 201.

Thus, according to the above-described embodiment, a metric used for connecting to the authentication server 110 (an authentication-server metric) is used, as the standard, so as to determine the roles played by wireless terminals during the mutual authentication. Subsequently, it becomes possible to determine one of the wireless-communication devices, the one having a path that provides a user with an easier access to the authentication server 110, to be the authenticator and the other wireless-communication device to be the supplicant.

Further, according to the above-described embodiment of the present invention, the authentication-server metric 593 is transmitted by using the field of the RSN 538 of the beacon frame 520 and/or the probe-response frame 570. However, the above-described method can be modified in various ways. For example, another field may be provided in the beacon frame 520, as described below.

Figure 12:
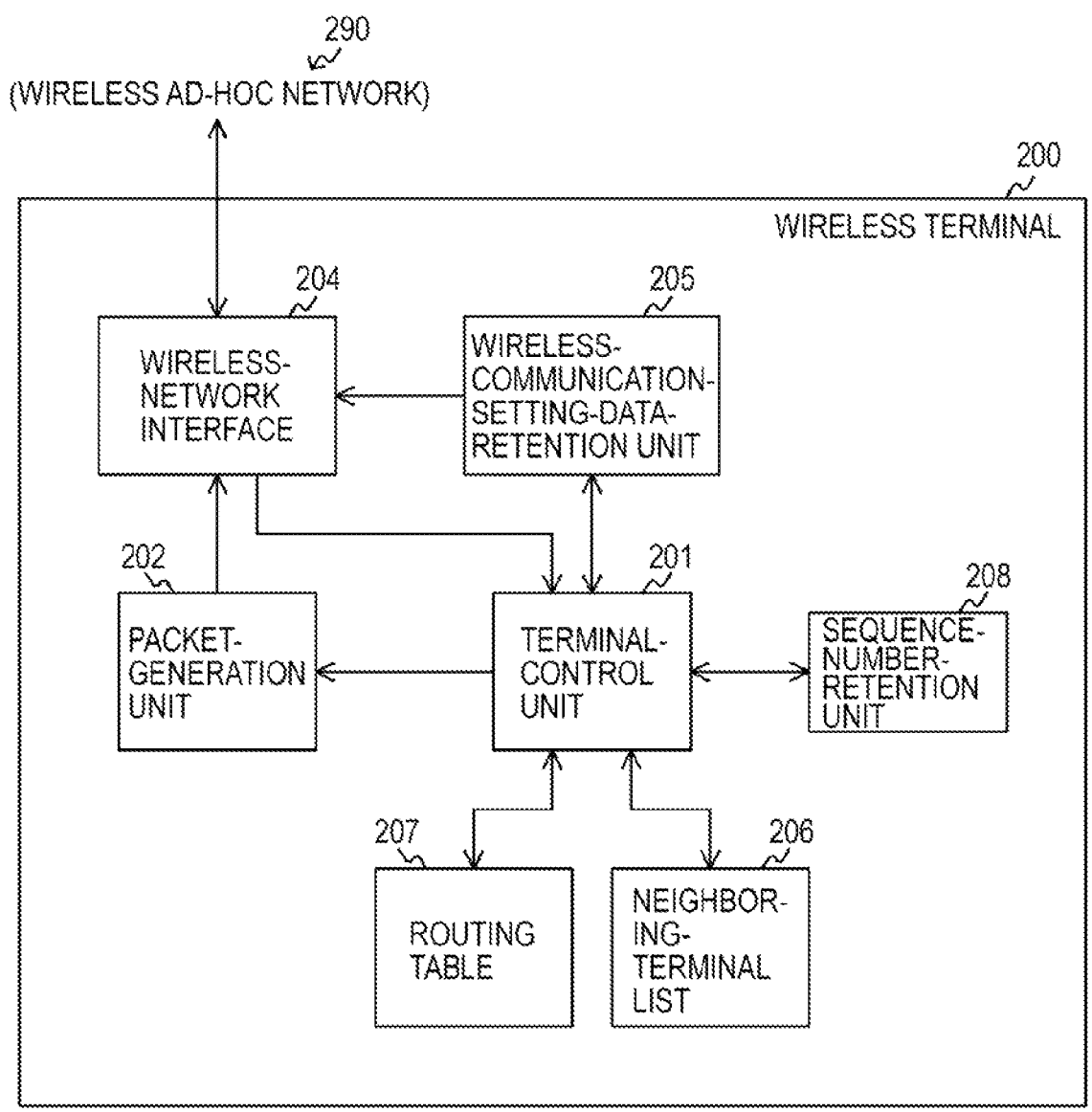
FIG. 12 shows an example modification of a wireless terminal according to an embodiment of the present invention.

FIG. 12 shows an example modification of the wireless terminal 200 according to an embodiment of the present invention. The example modification of the wireless terminal 200 is formed by adding a sequence-number-retention unit 208 to the wireless terminal 200 illustrated in FIG. 3. The sequence-number-retention unit 208 is provided to retain data on the sequence number used for performing an AS announcement that will be described later. Subsequently, upon receiving an AS announcement transmitted from each of different wireless-communication devices, the AS announcement that had been transmitted from a single bridge terminal, it becomes possible to identify each of the AS announcements.

Figure 13:
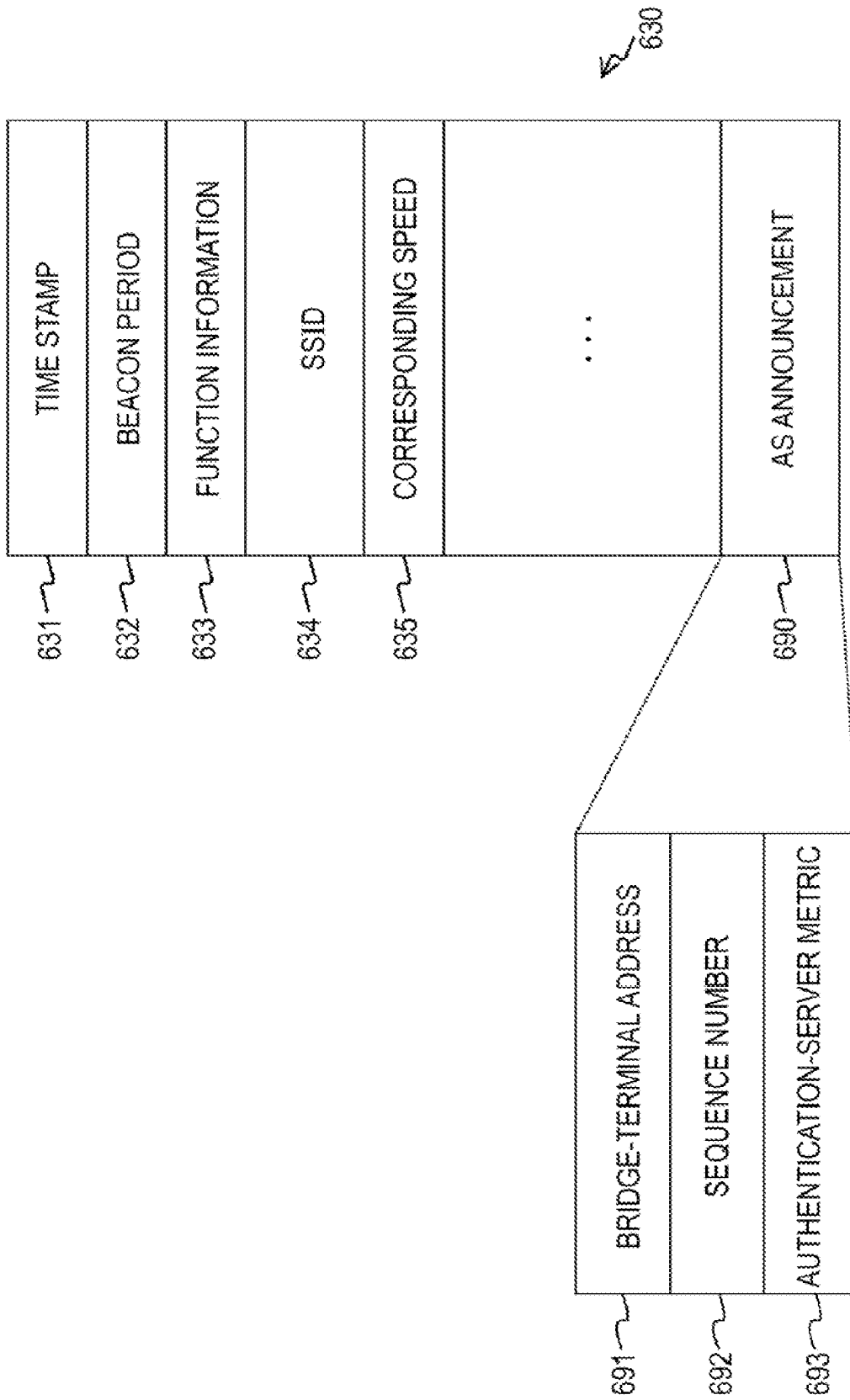
FIG. 13 shows a frame body of a beacon frame of the example modification of the wireless terminal shown in FIG. 12.

FIG. 13 shows a frame body 630 of a beacon frame of the example modification of the wireless terminal 200. Being different from the frame body 530 shown in FIG. 6, the frame body 630 is provided with the field of an AS announcement 690. The beacon frame including the AS announcement 690 is specifically referred to as an AS-announcement beacon. The AS-announcement beacon is expected to be transmitted once in about a few minutes, for example.

The AS-announcement 690 includes data on a bridge-terminal address 691, a sequence number 692, and an authentication-server metric 693.

The bridge-terminal address 691 is a field provided to show the address of the bridge terminal 120 functioning, as the transmission source of the AS-announcement beacon. The address of the bridge terminal 120 may be the MAC address of the bridge terminal 120, for example.

The sequence number 692 is a field showing a sequence number provided to each of AS-announcement beacons transmitted from the bridge terminal 120. Since different AS-announcement beacons are provided with different sequence numbers, the user can learn the reception of the same AS-announcement beacons transmitted via different paths. Every time the AS-announcement beacon is transmitted to the sequence-number-retention unit 208, the sequence-number-retention unit 208 makes the sequence-number-retention unit 208 retain the sequence number 692.

The authentication-server metric 693 is provided to retain the authentication-server metric of a path extending from a wireless-communication device which is the transmission source of the AS-announcement beacon to the authentication server 110. When the AS-announcement beacon is directly transmitted from the bridge terminal 120, the bridge terminal 120 becomes the transmission source of the AS-announcement beacon. If the AS-announcement beacon is not directly transmitted from the bridge terminal 120, the next previous wireless terminal which relayed the AS-announcement beacon becomes the transmission source of the AS-announcement beacon. Here, the address of the wireless terminal operating, as the transmission source, is shown in the field of the transmission-source address 525 of the MAC header of the beacon frame.

Figure 14:
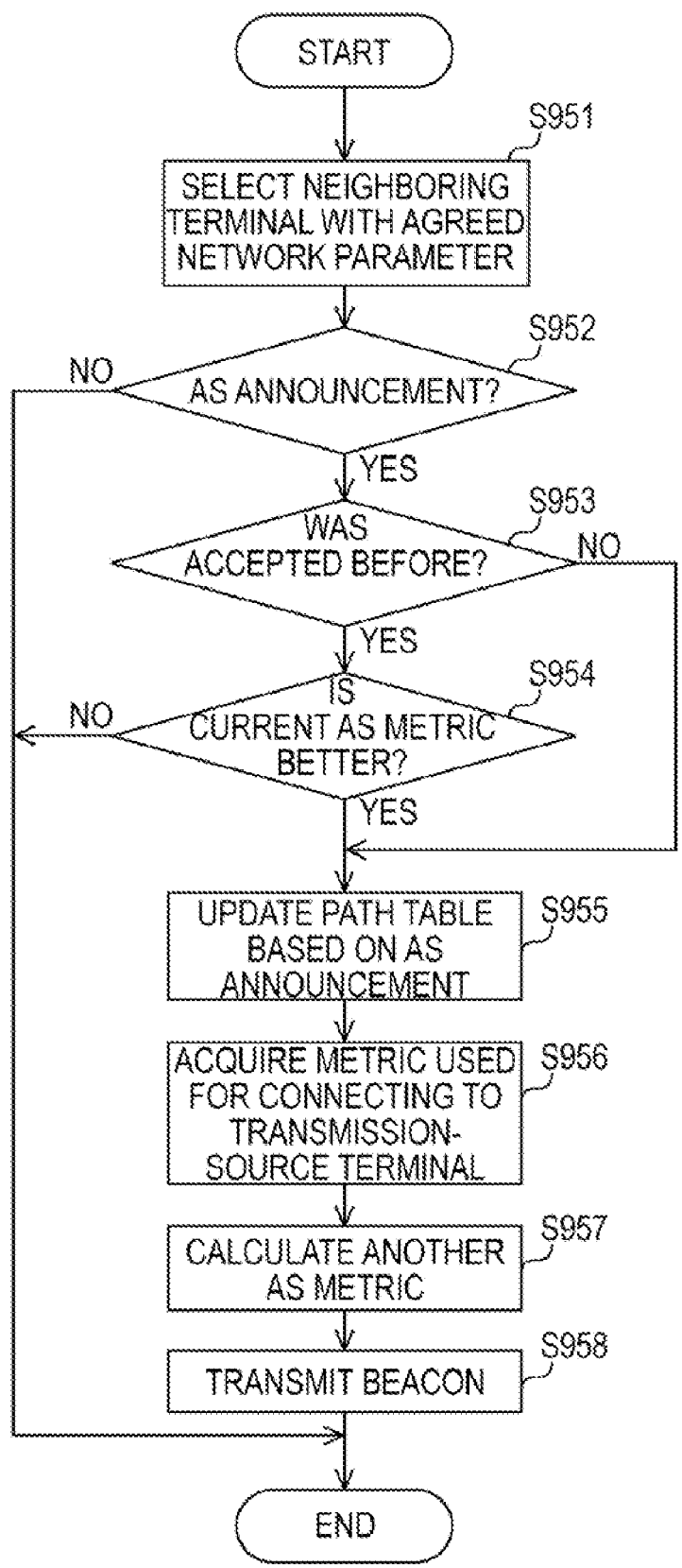
FIG. 14 shows example processing procedures performed by the example modification of the wireless terminal shown in FIG. 12.

FIG. 14 shows example processing procedures performed by the example modification of the wireless terminal 200 according to the embodiment of the present invention. The wireless terminal 200 selects an adjacent terminal whose network parameters agree with those of the wireless terminal 200, at step S951, and receives an AS-announcement beacon transmitted from the neighboring terminal, at step S952. Then, the wireless terminal 200 compares the sequence-number data retained in the field of the sequence number 692 and sequence-number data retained in the field of the sequence-number-retention unit 208. If the comparison result shows that the above-described sequence numbers are different from each other, it is determined that the AS-announcement beacon had never been transmitted by then, at step S953, and the routing table 207 is updated based on the AS-announcement beacon, at step S955.

Namely, due to the above-described update, the transmission-source address 525 of the AS-announcement beacon is set to the relay-terminal identifier 622 of the routing table 207 and the authentication-server metric 693 of the AS-announcement beacon is set to the authentication-server metric 623 of the routing table 207 when making entries onto the routing table 207 (FIG. 5) showing that the transmission-destination-terminal identifier 621 of the routing table 207 agrees with the bridge-terminal address 691 of the AS-announcement beacon.

Then, the wireless terminal 200 acquires a metric used for connecting to a wireless terminal which is the transmission source of the AS-announcement beacon, at step S956, and calculates a different authentication-server metric of the wireless terminal 200 by adding the acquired metric to the authentication-server metric 623 shown on the routing table 207 shown in FIG. 5, at step S957. The wireless terminal 200 determines the calculated different authentication-server metric to be the authentication-server metric 693 shown in FIG. 13, the authentication-server metric 693 being included in the AS-announcement beacon. Further, the wireless terminal 200 determines the address of the wireless terminal 200 to be the transmission-source address 525 and transfers the AS-announcement beacon. At that time, the bridge-terminal address 691 and the sequence number 692 are used without being changed.

After that, upon receiving the AS-announcement beacon, at step S952, the wireless terminal 200 makes the sequence-number comparison in the above-described manner. If the sequence numbers are the same as each other, it is determined that the AS-announcement beacon had been received before, at step S953. In that case, the authentication-server metric 693 of the AS-announcement beacon received at that time is compared to the authentication-server metric 623 shown on the routing table 207 (namely, the authentication-server metric of an AS-announcement beacon that had been received previously). If the comparison result shows that the authentication-server metric 693 of the AS-announcement beacon received at that time is better than that of the authentication-server metric of the AS-announcement beacon that had been received previously, at step S954, the routing table 207 is updated based on the AS-announcement beacon received at that time, at step S955.

Thus, according to the above-described example modifications, each of the wireless terminals transfers the AS-announcement beacon through flooding. Subsequently, the wireless terminals generate a tree topology showing paths leading to the authentication server 110. The authentication-server metric can be calculated based on the tree topology.

An embodiment of the present invention shows an example of how the present invention is embodied. There are correspondences between the features of the claims and the specific elements disclosed in an embodiment of the present invention. However, without being limited to the above-described correspondences, it should be understood by those skilled in the art that various modifications, combinations, sub-combinations and alterations may occur depending on design requirements and other factors insofar as they are within the scope of the appended claims or the equivalents thereof.

Namely, according to an embodiment of the present invention, an authentication server corresponds to the authentication server 110, for example. Further, a communication-setting-data-retention section corresponds to the communication-setting-data-retention unit 205, for example. Further, a signal-reception section corresponds to the wireless-network interface 204. Further, a control section corresponds to the terminal-control unit 201, for example. Further, a self-authentication-server metric corresponds to the "current authentication-server metric of the wireless terminal 200" retained in the communication-setting-data-retention unit 205, and a nonself-authentication-server metric corresponds to the authentication-server metric 593 of the RSN and/or the authentication-server metric 693 included in the AS announcement 690.

Further, according to an embodiment of the present invention, the address of a pertinent wireless-communication device corresponds to the MAC address of the wireless terminal 200, for example, the MAC address being retained in the communication-setting-data-retention unit 205. Further, the address of a different wireless-communication device corresponds to the transmission-source address 525 of the beacon frame 520 and/or the transmission-source address 575 of the probe-response frame 570, and/or the terminal identifier 611 shown on the neighboring-terminal list 206.

Further, according to an embodiment of the present invention, first connectivity information corresponds to the Connected-to-AS 592, and second connectivity information corresponds to the authentication state 612 shown on the neighboring-terminal list 206, for example.

Further, according to an embodiment of the present invention, a nonself-authentication-server-metric-retention section corresponds to the routing table 207, for example. Further, a neighboring-metric-acquisition section corresponds to the wireless-network interface 204, for example.

Further, according to an embodiment of the present invention, an authentication server corresponds to the authentication server 110, for example. Further, a communication-setting-data-retention section corresponds to the communication-setting-data-retention unit 205, for example. Further, a signal-transmission section and a signal-reception section correspond to the wireless-network interface 204, for example. Further, a control section corresponds to the terminal-control unit 201, for example.

Further, according to embodiments of the present invention, a signal-reception-processing procedure corresponds to step S911, for example. Further, a supplicant-setting-processing procedure corresponds to step S921, for example. Further, an authenticator-setting-processing procedure corresponds to step S922, for example.

Here, the series of processing procedures described in the above-described embodiments may be understood, as a method including the above-described series of processing procedures. Further, the series of processing procedures may be provided, as a program making a computer perform the series of processing procedures and/or a recording medium recording the program.

What is claimed is:

1. A wireless-communication device performing mutual authentication between the wireless-communication device and a different wireless-communication device by using an authentication server, the wireless-communication device comprising:
communication-setting-data-retention means configured to retain communication-setting data including a first metric corresponding to the path from the wireless-communication device to the authentication server, as a self-authentication-server metric;
signal-reception means configured to receive a predetermined signal transmitted from the different wireless-communication device, the predetermined signal including a second metric corresponding to the path from the different wireless-communication device to the authentication server, as a nonself-authentication-server metric; and control means configured to make a first setting so that the wireless-communication device operates, as a supplicant, during the mutual authentication when the self-authentication-server metric is better than the nonself-authentication-server metric, and make a second setting so that the wireless-communication device operates, as an authenticator, during the mutual authentication when the self-authentication-server metric is worse than the nonself-authentication-server metric.

2. The wireless-communication device according to claim 1, wherein the communication-setting data retained in the communication-setting-data-retention means includes data on a first address of the wireless-communication device, wherein the predetermined signal includes data on a second address of the different wireless-communication device, and wherein when the self-authentication-server metric is equivalent to the nonself-authentication-server metric, the control means makes a third setting so that the wireless-communication device operates, as either the authenticator or the supplicant, during the mutual authentication according to a relationship between the first address and the second address.

3. The wireless-communication device according to claim 2, wherein when the first address is larger than the second address, the control means makes a fourth setting so that the wireless-communication device operates, as the authenticator, during the mutual authentication, and wherein when the first address is not larger than the second address, the control means makes a fifth setting so that the wireless-communication device operates, as the supplicant, during the mutual authentication.

4. The wireless-communication device according to claim 1, wherein the predetermined signal includes first accessibility information indicating whether or not the different wireless communication device can make access to the authentication server, wherein the communication-setting data retained in the communication-setting-data-retention means includes second accessibility information indicating whether or not the wireless-communication device can make access to the authentication server, wherein when the first accessibility information shows that the different wireless-communication device can make access to the authentication server and the second accessibility information shows that the wireless-communication device makes access to the authentication server with difficulty, the control means makes a sixth setting so that the wireless-communication device operates, as the supplicant, during the mutual authentication irrespective of a relationship between the self-authentication-server metric and the nonself-authentication-server metric, and wherein when the first accessibility information shows that the different wireless-communication device makes access to the authentication server with difficulty and the second accessibility information shows that the wireless-communication device can make access to the authentication server, the control means makes a seventh setting so that the wireless-communication device operates, as the authenticator, during the mutual authentication irrespective of the relationship between the self-authentication-server metric and the nonself-authentication-server metric.

5. The wireless-communication device according to claim 1, wherein the first metric and/or the second metric shows wireless-communication quality of a wireless-communication path leading to the authentication server.

6. The wireless-communication device according to claim 1, wherein the first metric and/or the second metric shows the number of at least one hop of a wireless-communication path leading to the authentication server.

7. The wireless-communication device according to claim 1, wherein the predetermined signal is a broadcast signal transmitted from the different wireless-communication device.

8. The wireless-communication device according to claim 1, wherein the predetermined signal is an acknowledgment signal transmitted from the different wireless-communication device in response to a request issued from the wireless-communication device.

9. The wireless-communication device according to claim 1, wherein when the control means calculates a third metric corresponding to the path to the authentication server after the mutual authentication is achieved and the third metric is better than the self-authentication-server metric retained in the communication-setting-data-retention means, the control means makes the communication-setting-data-retention means retain the third metric.

10. The wireless-communication device according to claim 1, further comprising:

nonself-authentication-server-metric-retention means provided for the different wireless-communication device, the nonself-authentication-server-metric-retention means being configured to retain the nonself-authentication-server metric; and neighboring-metric-acquisition means configured to acquire a fourth metric provided between the wireless-communication device and the different wireless-communication device, as a neighboring metric, wherein the control means calculates the self-authentication-server metric by adding the nonself-authentication-server metric to the neighboring metric.

11. The wireless-communication device according to claim 10, wherein when there is a plurality of the different wireless-communication devices, upon receiving the predetermined signal transmitted from each of the different wireless-communication devices, the signal-reception means makes the nonself-authentication-server-metric-retention means retain the nonself-authentication-server metric based on the predetermined signal including the nonself-authentication-server metric which is the best of the nonself-authentication-server metrics of all of the predetermined signals.

12. A communication system performing mutual authentication between at least two wireless-communication devices by using an authentication server, wherein each of the wireless-communication devices comprises:

communication-setting-data-retention means configured to retain communication-setting data including a first metric corresponding to the path from the wireless-communication device to the authentication server, as a self-authentication-server metric;

signal-transmission means configured to transmit a first signal including the self-authentication-server metric;

signal-reception means configured to receive a second signal transmitted from the different wireless-communication device, the second signal including a second metric corresponding to the path from the different wireless-communication device to the authentication server, as a nonself-authentication-server metric; and control means configured to make a first setting so that the wireless-communication device operates, as a supplicant, during the mutual authentication when the self-authentication-server metric is better than the nonself-authentication-server metric, and make a second setting so that the wireless-communication device operates, as an authenticator, during the mutual authentication when the self-authentication-server metric is worse than the nonself-authentication-server metric.

13. A communication-control method used for a wireless-communication device performing mutual authentication between the wireless-communication device and a different wireless-communication device by using an authentication server, the communication-control method comprising the steps of:

receiving a predetermined signal transmitted from the different wireless-communication device, the predetermined signal including a first metric corresponding to the path from the different wireless-communication device to the authentication server, as a nonself-authentication-server metric;

making a first setting so that the wireless-communication device operates, as a supplicant, during the mutual authentication when a second metric corresponding to the path from the wireless-communication device to the authentication server is better than the nonself-authentication-server metric; and making a second setting so that the wireless-communication device operates, as an authenticator, during the mutual authentication when the second metric is worse than the nonself-authentication-server metric.

14. A non-transitory computer-readable storage medium encoded with a program, the program, when installed onto a wireless-communication device performing mutual authentication between the wireless-communication device and a different wireless-communication device by using an authentication server and executed, the program making a computer perform the steps of:

receiving a predetermined signal transmitted from the different wireless communication device, the predetermined signal including a first metric corresponding to the path from the different wireless-communication device to the authentication server, as a nonself-authentication-server metric;

making a first setting so that the wireless-communication device operates, as a supplicant, during the mutual authentication when a second metric corresponding to the path from the wireless-communication device to the authentication server is better than the nonself-authentication-server metric; and making a second setting so that the wireless-communication device operates, as an authenticator, during the mutual authentication when the second metric is worse than the nonself-authentication-server metric.

15. A wireless-communication device performing mutual authentication between the wireless-communication device and a different wireless-communication device by using an authentication server, the wireless-communication device comprising:

a communication-setting-data-retention unit configured to retain communication-setting data including a first metric corresponding to the path from the wireless-communication device to the authentication server, as a self-authentication-server metric;

a signal-reception unit configured to receive a predetermined signal transmitted from the different wireless-communication device, the predetermined signal including a second metric corresponding to the path from the different wireless-communication device to the authentication server, as a nonself-authentication-server metric; and a control unit configured to make a first setting so that the wireless-communication device operates, as a supplicant, during the mutual authentication when the self-authentication-server metric is better than the nonself-authentication-server metric, and make a second setting so that the wireless-communication device operates, as an authenticator, during the mutual authentication when the self-authentication-server metric is worse than the nonself-authentication-server metric.

16. A communication system performing mutual authentication between at least two wireless-communication devices by using an authentication server, wherein each of the wireless-communication devices comprises:

a communication-setting-data-retention unit configured to retain communication-setting data including a first metric corresponding to the path from the wireless-communication device to the authentication server, as a self-authentication-server metric;

a signal-transmission unit configured to transmit a first signal including the self-authentication-server metric;

a signal-reception unit configured to receive a second signal transmitted from the different wireless-communication device, the second signal including a second metric corresponding to the path from the different wireless-communication device to the authentication server, as a nonself-authentication-server metric; and a control unit configured to make a first setting so that the wireless-communication device operates, as a supplicant, during the mutual authentication when the self-authentication-server metric is better than the nonself-authentication-server metric, and make a second setting so that the wireless-communication device operates, as an authenticator, during the mutual authentication when the self-authentication-server metric is worse than the nonself-authentication-server metric.

* * * * *